(12) United States Patent
Eubank et al.

(10) Patent No.: US 11,128,977 B2
(45) Date of Patent: Sep. 21, 2021

(54) SPATIAL AUDIO DOWNMIXING

(71) Applicant: Apple Inc., Cupertino, CA (US)

(72) Inventors: Christopher T. Eubank, San Francisco, CA (US); Matthew S. Connolly, San Jose, CA (US); Stephen E. Pinto, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/645,429

(22) PCT Filed: Sep. 26, 2018

(86) PCT No.: PCT/US2018/052960
§ 371 (c)(1),
(2) Date: Mar. 6, 2020

(87) PCT Pub. No.: WO2019/067620
PCT Pub. Date: Apr. 4, 2019

(65) Prior Publication Data
US 2020/0221248 A1    Jul. 9, 2020

Related U.S. Application Data

(60) Provisional application No. 62/566,228, filed on Sep. 29, 2017.

(51) Int. Cl.
| H04S 7/00 | (2006.01) |
| G06F 3/16 | (2006.01) |
| H04S 3/00 | (2006.01) |

(52) U.S. Cl.
CPC .............. *H04S 7/304* (2013.01); *G06F 3/165* (2013.01); *H04S 3/008* (2013.01);
(Continued)

(58) Field of Classification Search
CPC . H04S 3/008; H04S 7/304; H04S 7/40; H04S 2400/01; H04S 2400/03; H04S 2400/11; G06F 3/165
(Continued)

(56) References Cited

U.S. PATENT DOCUMENTS

| 5,513,129 A | 4/1996 | Bolas et al. |
| 7,636,448 B2 | 12/2009 | Metcalf |

(Continued)

FOREIGN PATENT DOCUMENTS

| CN | 1717955 | 1/2006 |
| CN | 104604257 | 5/2015 |

(Continued)

OTHER PUBLICATIONS

International Preliminary Report on Patentability for International Application No. PCT/US2018/052960 dated Apr. 9, 2020, 9 pages.

(Continued)

*Primary Examiner* — Xu Mei
(74) *Attorney, Agent, or Firm* — Womble Bond Dickinson (US) LLP

(57) ABSTRACT

Channels of audio data in a spatial audio object are associated with any one or more of a direction and a location of one or more recorded sounds, which channels are to be reproduced as spatial sound. A visualized spatial sound object represents a snapshot/thumbnail of the spatial sound. To preview the spatial sound (by experiencing its snapshot or thumbnail), a user manipulates the orientation of the visualized spatial sound object, and a weighted downmix of the channels is rendered for output as a spatial preview sound, e.g., a single output audio signal is provided to a spatial audio renderer; one or more of the channels that are oriented toward the user are emphasized in the preview (Continued)

sound, more than channels that are oriented away from the user. Other aspects are also described and claimed.

20 Claims, 4 Drawing Sheets

(52) U.S. Cl.
CPC ....... *H04S 2400/01* (2013.01); *H04S 2400/03* (2013.01); *H04S 2400/11* (2013.01)

(58) Field of Classification Search
USPC ................ 381/303, 309, 310, 20, 23, 119
See application file for complete search history.

(56) References Cited

U.S. PATENT DOCUMENTS

| | | | |
|---|---|---|---|
| 9,348,829 | B2 | 5/2016 | Kohut et al. |
| 9,573,062 | B1 | 2/2017 | Long et al. |
| 9,602,938 | B2 | 3/2017 | Goldstein et al. |
| 10,362,431 | B2* | 7/2019 | Breebaart ............... H04S 3/004 |
| 2006/0059120 | A1 | 3/2006 | Xiong et al. |
| 2012/0330659 | A1* | 12/2012 | Nakadai .................. G10L 21/06 |
| | | | 704/235 |
| 2015/0124973 | A1* | 5/2015 | Arteaga ................ G10L 19/008 |
| | | | 381/22 |
| 2016/0381483 | A1 | 12/2016 | Robinson et al. |
| 2017/0257724 | A1 | 9/2017 | Bosnjak et al. |
| 2019/0208349 | A1* | 7/2019 | Greff ......................... H04S 7/30 |

FOREIGN PATENT DOCUMENTS

| | | |
|---|---|---|
| CN | 104995681 | 10/2015 |
| CN | 105900169 | 8/2016 |
| WO | 2011019188 | 2/2011 |

OTHER PUBLICATIONS

International Search Report and Written Opinion for International Application No. PCT/US2018/052960 dated Dec. 18, 2018, 16 pages.
Pike, Chris, et al., "Object-based spatial audio production for virtual reality using the Audio Definition Model", Audio Engineering Society Conference Paper, Sep. 30, 2016, 7 pages.
Office Action and Search Report for Chinese Application No. 2018800571945 dated Jan. 29, 2021, 14 pages.
Pike, Chris, et al., "Object-based spatial audio production for virtual reality using the Audio Definition Model," AES Conference on Audio for Virtual Reality and Augmented Reality, Oct. 31, 2016, 7 pages.
Zhou, Wen "Content-based Audio Parameter Extraction and Animation," Computer Knowledge and Technology, Jan. 25, 2010, 3 pages.

* cited by examiner

SPATIAL AUDIO DOWNMIXING

This non-provisional patent application claims the benefit of the earlier filing date of U.S. provisional application No. 62/566,228 filed Sep. 29, 2017.

TECHNICAL FIELD

The technical field relates generally to computerized data processing systems and methods for audio processing, and in particular to spatial audio processing.

BACKGROUND

Producing three-dimensional (3D) sound effects in augmented reality (AR), virtual reality (VR), and mixed reality (MR) applications (encompassed by the term "simulated reality" or SR, as used here) is commonly used to enhance media content. Examples of spatial audio formats designed to produce 3D sound include MPEG-H (Moving Picture Experts Group) 3D Audio standards, HOA (Higher-order Ambisonics) spatial audio techniques, and DOLBY ATMOS surround sound technology.

For example, sound designers add 3D sound effects by manipulating sounds contained in spatial audio objects to enhance a scene in an SR application, where the sounds are ambient sounds and/or discrete sounds that can be virtually located for playback by the spatial audio system anywhere in the virtual 3D space created by the SR application.

SUMMARY

Embodiments of spatial audio downmixing as herein described enable augmented reality/virtual reality/mixed reality (SR) application developers, and listeners in an SR experience created by the SR application, to preview a sound from audio data in which the sound has been encoded and that is capable of being composed into the SR application. In one embodiment the audio data in which the sound is recorded or encoded is stored as a spatial audio object that preserves spatial characteristics of one or more recorded sounds. In one embodiment, the spatial audio object contains several channels of audio data representing the one or more recorded sounds, each channel being associated with any one or more of a direction and a location (distance), e.g. of a source of the recorded sound. Note that there may be two or more of such channels that are associated with a given direction or location, e.g., a multi-channel microphone pickup. In other embodiments, the spatial audio object contains multiple channels of an ambisonics format (spherical harmonics format) representation of a sound field where in that case each channel is associated with a respective spatial distribution, e.g., B-format WXYZ channels. To then enable the aural preview, the audio channels are subjected to a spatial audio downmixing operation.

In one embodiment, spatial audio downmixing includes generating a visualized spatial sound object (or more generally, presenting a visualization of the spatial audio object) to represent or enable a user to experience an aural snapshot of the plurality of channels of audio data, and presenting the visualized spatial sound object in a user interface, e.g., a graphical user interface. For example, the visualized spatial sound object can be a virtual globe (e.g., a topological sphere, a cube, a bubble, a polyhedron) or other two or three-dimensional virtual object that can represent multiple channels of sound emanating, from a shared location in space, in multiple directions. More generally, each of the channels may be associated with a portion of the visual representation based on that channel's respective direction or location.

In one embodiment, a graphical user interface is configured to enable its user to manipulate a relative orientation between the visualized spatial sound object and a listening position (e.g., maintaining the listening position fixed while turning the visualized spatial sound object, or moving the listening position around while not turning the sound object). The preview process includes weighting each channel of the plurality of channels of audio data based on the orientation of the visualized spatial sound object relative to the listening position (e.g., where the user is located). In one instance, the preview process is orienting each of the weighted channels in a direction that is opposite to an original orientation of the respective weighted channel, and downmixing the reoriented weighted channels. A channel that is visually oriented toward a predetermined object, such as one that represents a location of the user (e.g., facing toward a viewing position or viewing orientation of the user) may be weighted more than channels oriented away from the predetermined object (e.g., away from the user or viewing location). The weighted channels are downmixed into one or more virtual speaker driver signals, and these will be converted by a spatial audio processor to drive two or more real speakers (e.g., a left and right headphone pair) which present the sound of the downmixed weighted channels, as an aural preview of the spatial audio object. In this manner the visualized spatial sound object functions as a container of snapshots or thumbnails of the recorded sounds in the spatial audio object.

The recorded sounds can be explored or previewed one at a time by orienting the visualized spatial sound object until a graphical portion of the object (that represents a particular sound of interest) directly faces or is in the direction of the user. In some instance, two or more sounds can be previewed simultaneously as a blend or mix, in response to the visualized spatial sound object being oriented so that parts of two or more portions (corresponding to those two or more sounds) directly face the user. The object may contain different ambient sounds of real-world environments, e.g., one or more channels may be the sound recorded at a particular beach (e.g., a single microphone channel recording, a multi-channel recording), another channel may be the sound recorded in an alpine forest, and another channel may be the sound recorded in a city. The object may also contain a channel that is a synthesized sound of a virtual 3D environment.

The preview process continues with the audio channels of the object being weighted according to the graphical portion that is facing the user, and then downmixed into one or more audio signals that drive one or more acoustic output transducers, respectively, e.g., earpiece speakers, loudspeakers, through which the user hears the previewed sound (and not any other sounds that are also contained in the object.)

In one embodiment, generating the visualized spatial sound object to represent a snapshot of the plurality of channels of audio data includes assigning each channel of the plurality of channels of audio data to a shared location in space and orienting each assigned channel to emit (virtual sound) outward from the shared location. For example, each assigned channel is oriented to emit virtual sound, using the assigned channel, outward from the shared location in a direction that is opposite to that from which a predominant recorded sound in the assigned channel originated, to form a virtual globe of the audio data. A respective image is added to the visualized spatial sound object for each oriented channel, wherein the respective image is that of a source of the predominant recorded sound in the oriented channel. This results in the formation of a virtual globe (or other multi-dimensional virtual representation) of sounds recorded in the audio data, where each assigned channel is oriented to emit in a direction that is opposite to that from which predominant recorded sound in the assigned channel originated.

In one embodiment, generating the visualized spatial sound object includes adding an image to the visualized spatial sound object for each of the oriented channels of the visualized spatial sound object. The image may be a still picture, or it may be part of a video sequence, and may be added to the visualized sound object for each of oriented channels. The image may be that of a source of the predominant recorded sound in the oriented channel, or of a scene associated with the recorded sound, such as a tree for a forest sound, a car for a city sound, a wave for a beach sound, a video of crashing water in a water fall, a video of crashing waves at a beach, a video of trees moving in the wind, and the like. Adding the image causes the image to be displayed on a portion of the surface of the visualized spatial sound object that corresponds to the outward direction of the oriented channel that is associated with that portion. The images may cover the surface of the virtual globe like continents on Earth that are visible from outer space; they function as a visual aid for previewing sounds. In some embodiments, however, previewing a sound can be accomplished without the image as a visual aid.

In one embodiment, presenting the visualized spatial sound object is performed in a user interface that is configured to enable a user to manipulate (e.g, using a finger on a touch screen, a mouse input to move a cursor on a screen, or by speaking a command) an orientation of the visualized spatial sound object. An image of the visualized spatial sound object can be displayed for example on a flat display screen, in a 2D or in a 3D display mode. The user interface may be configured to rotate the displayed visualized spatial sound object about different axes, in accordance with the received user input and in real-time, or more generally orient the visualized spatial sound object relative to the user, so that a different portion of the visualized spatial sound object is visible to the user. In one embodiment, the portion of the visualized spatial sound object that is visible to the user includes the image that was added to the object and associated with the one or more of the oriented channels. Thus, one portion at a time may be facing or directed towards the user so that the sounds contained in the object are previewed one at a time as the orientation of the object is changing.

In one embodiment, weighting each channel of the plurality of channels of audio data based on the orientation of the visualized spatial sound object is performed continuously (repeatedly and updated in real-time based on the current orientation.) This may be based on which portions of the visualized spatial sound object (and therefore which channels associated with that portion) are oriented toward the user and which portions are oriented away from the user. The sounds may thus share a common location from which their virtual sources, respectively, emit sound outwardly. The snapshot or thumbnail of the sounds can be explored and previewed by orienting the visualized spatial sound object to a sound of interest, such as a particular sound in the ambient sound of a real-world environment like a beach, alpine forest or city sound, or a particular sound in the synthesized sound of a virtual 3D environment.

In one embodiment, previewing the sound in the SR environment depends upon how the sound represented by the spatial audio object is simulated in a spatial audio/spatial sound playback system, including single listener playback systems that use binaural rendering (e.g., through headphones worn by the user who wishes to preview sound through the headphones), loudspeakers, or a combination of headphones and loudspeakers. The spatial audio downmixing may also support a variety of sound sources and audio encodings (for reproducing sound to simulate spatial audio in sound playback systems).

The spatial audio object contains audio data encoding sounds, including any one or more of i) a monaural recording of an individual sound, a multi-channel recording of a sound environment including any one of a recording produced using an array of microphones, a recorded mix of multiple sound sources including a mix of multiple discrete sounds recorded using one or more microphones, or a recording that preserves spatial characteristics of recorded sound, and synthesized audio data for producing one or more sounds or iv) a recording in ambisonic format.

The audio data in which the sound is encoded (for preview by the user) may be based on characteristics that are associated with how the sound was captured, including any one or more of i) a location of the sound including a discrete location of the sound or a location encoded using the aforementioned Higher Order Ambisonic (HOA) format, at least one directivity of the sound per channel of audio data, the directivity representing any one of a width, shape or a mathematical function used to convey directivity of the sound, an orientation of the sound, including an orientation per channel of audio data, iv) an original sound pressure level (SPL) of the sound, including a distance at which the SPL was captured, v) a size or shape of the sound expressed as a volumetric size or shape of sound, e.g., as a polygonal mesh, and vi) a playback rate for the sound, including a global playback rate for all channels of the audio data.

In one embodiment, the plurality of characteristics associated with how the sound was encoded in the audio data includes a description of any one or more recording systems used to capture the sound, including a description of an array of microphones used to record the sound.

The methods described here can be performed by a data processing system having sound output capability, said to preview sound in an SR environment, in accordance with the spatial audio downmixing techniques described here. The data processing system may be a server computer, a desktop computer or other data processing system in which one or more processors (generically referred to here as "a processor") execute a computer program or instructions stored in one or more non-transitory machine readable media that cause the system to perform the one or more methods described herein.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features

DETAILED DESCRIPTION

Figure 1:
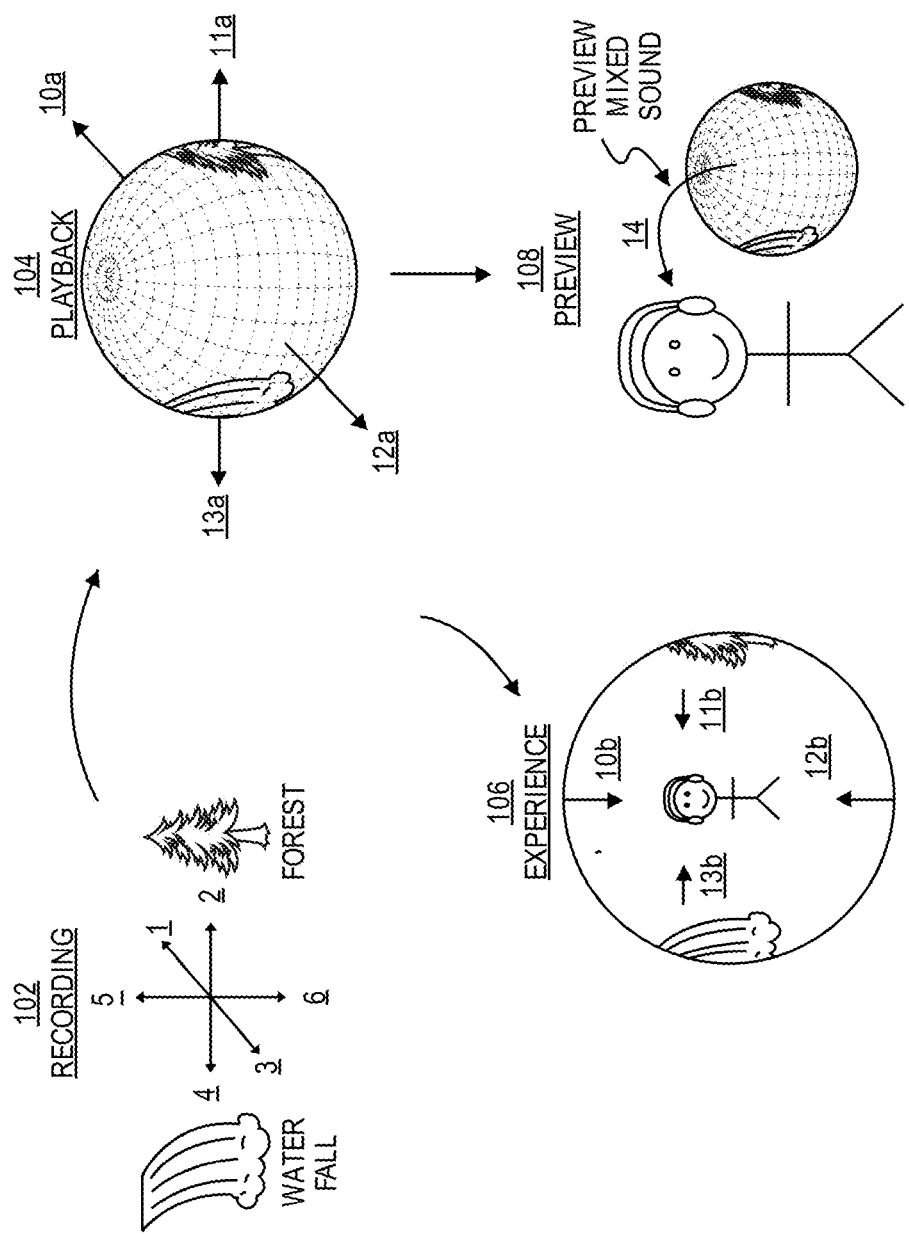
FIG. 1 is a block diagram illustrating an overview of spatial sound use in SR environments in accordance with one or more embodiments described herein.

Various embodiments or aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Physical Setting

A physical setting refers to a world that individuals can sense and/or with which individuals can interact without assistance of electronic systems. Physical settings (e.g., a physical forest) include physical elements (e.g., physical trees, physical structures, and physical animals). Individuals can directly interact with and/or sense the physical setting, such as through touch, sight, smell, hearing, and taste.

Simulated Reality

In contrast, a simulated reality (SR) setting refers to an entirely or partly computer-created setting that individuals can sense and/or with which individuals can interact via an electronic system. In SR, a subset of an individual's movements is monitored, and, responsive thereto, one or more attributes of one or more virtual objects in the SR setting is changed in a manner that conforms with one or more physical laws. For example, a SR system may detect an individual walking a few paces forward and, responsive thereto, adjust graphics and audio presented to the individual in a manner similar to how such scenery and sounds would change in a physical setting. Modifications to attribute(s) of virtual object(s) in a SR setting also may be made responsive to representations of movement (e.g., audio instructions).

An individual may interact with and/or sense a SR object using any one of his senses, including touch, smell, sight, taste, and sound. For example, an individual may interact with and/or sense aural objects that create a multi-dimensional (e.g., three dimensional) or spatial aural setting, and/or enable aural transparency. Multi-dimensional or spatial aural settings provide an individual with a perception of discrete aural sources in multi-dimensional space. Aural transparency selectively incorporates sounds from the physical setting, either with or without computer-created audio. In some SR settings, an individual may interact with and/or sense only aural objects.

Virtual Reality

One example of SR is virtual reality (VR). A VR setting refers to a simulated setting that is designed only to include computer-created sensory inputs for at least one of the senses. A VR setting includes multiple virtual objects with which an individual may interact and/or sense. An individual may interact and/or sense virtual objects in the VR setting through a simulation of a subset of the individual's actions within the computer-created setting, and/or through a simulation of the individual or his presence within the computer-created setting.

Mixed Reality

Another example of SR is mixed reality (MR). AMR setting refers to a simulated setting that is designed to integrate computer-created sensory inputs (e.g., virtual objects) with sensory inputs from the physical setting, or a representation thereof. On a reality spectrum, a mixed reality setting is between, and does not include, a VR setting at one end and an entirely physical setting at the other end.

In some MR settings, computer-created sensory inputs may adapt to changes in sensory inputs from the physical setting. Also, some electronic systems for presenting MR settings may monitor orientation and/or location with respect to the physical setting to enable interaction between virtual objects and real objects (which are physical elements from the physical setting or representations thereof). For example, a system may monitor movements so that a virtual plant appears stationery with respect to a physical building.

Augmented Reality

One example of mixed reality is augmented reality (AR). An AR setting refers to a simulated setting in which at least one virtual object is superimposed over a physical setting, or a representation thereof. For example, an electronic system may have an opaque display and at least one imaging sensor for capturing images or video of the physical setting, which are representations of the physical setting. The system combines the images or video with virtual objects, and displays the combination on the opaque display. An individual, using the system, views the physical setting indirectly via the images or video of the physical setting, and observes the virtual objects superimposed over the physical setting. When a system uses image sensor(s) to capture images of the physical setting, and presents the AR setting on the opaque display using those images, the displayed images are called a video pass-through. Alternatively, an electronic system for displaying an AR setting may have a transparent or semi-transparent display through which an individual may view the physical setting directly. The system may display virtual objects on the transparent or semi-transparent display, so that an individual, using the system, observes the virtual objects superimposed over the physical setting. In another example, a system may comprise a projection system that projects virtual objects into the physical setting. The virtual objects may be projected, for example, on a physical surface or as a holograph, so that an individual, using the system, observes the virtual objects superimposed over the physical setting.

An augmented reality setting also may refer to a simulated setting in which a representation of a physical setting is altered by computer-created sensory information. For example, a portion of a representation of a physical setting may be graphically altered (e.g., enlarged), such that the altered portion may still be representative of but not a faithfully-reproduced version of the originally captured image(s). As another example, in providing video pass-through, a system may alter at least one of the sensor images to impose a particular viewpoint different than the viewpoint captured by the image sensor(s). As an additional example, a representation of a physical setting may be altered by graphically obscuring or excluding portions thereof.

Augmented Virtuality

Another example of mixed reality is augmented virtuality (AV). An AV setting refers to a simulated setting in which a computer-created or virtual setting incorporates at least one sensory input from the physical setting. The sensory input(s) from the physical setting may be representations of at least one characteristic of the physical setting. For example, a virtual object may assume a color of a physical element captured by imaging sensor(s). In another example, a virtual object may exhibit characteristics consistent with actual weather conditions in the physical setting, as identified via imaging, weather-related sensors, and/or online weather data. In yet another example, an augmented reality forest may have virtual trees and structures, but the animals may have features that are accurately reproduced from images taken of physical animals.

Hardware

Many electronic systems enable an individual to interact with and/or sense various SR settings. One example includes head mounted systems. A head mounted system may have an opaque display and speaker(s). Alternatively, a head mounted system may be designed to receive an external display (e.g., a smartphone). The head mounted system may have imaging sensor(s) and/or microphones for taking images/video and/or capturing audio of the physical setting, respectively. A head mounted system also may have a transparent or semi-transparent display. The transparent or semi-transparent display may incorporate a substrate through which light representative of images is directed to an individual's eyes. The display may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one embodiment, the transparent or semi-transparent display may transition selectively between an opaque state and a transparent or semi-transparent state. In another example, the electronic system may be a projection-based system. A projection-based system may use retinal projection to project images onto an individual's retina. Alternatively, a projection system also may project virtual objects into a physical setting (e.g., onto a physical surface or as a holograph). Other examples of SR systems include heads up displays, automotive windshields with the ability to display graphics, windows with the ability to display graphics, lenses with the ability to display graphics, headphones or earphones, speaker arrangements, input mechanisms (e.g., controllers having or not having haptic feedback), tablets, smartphones, and desktop or laptop computers.

FIG. 1 illustrates an overview of how sound is recorded (recording 102), and played back (playback 104) as either being experienced by an end user (experience 106) or previewed by for example a developer (preview 108), in SR environments. For example, in the recording 102, a microphone array may be used to capture sounds from different directions, where what is shown is an example of six microphones capturing ambient sound in six cardinal directions from a central origin, 1, 2, 3, 4, 5 and 6. To illustrate, the example here has sounds from a waterfall captured or recorded on one side from direction 4, and sounds from a forest captured on the opposite side from direction 2. During playback 104, these sounds are reproduced to replicate their original directionality, e.g. the waterfall at 13a, the forest at 11a, and a mix of the waterfall and forest at 12a, 10a. Other such "channels" of sound are not shown but may be produced or added at playback 104 to enhance the original recording of the waterfall for example, through added reflection, reverberation, and the like. During the SR experience 106 of the sounds, the sounds are now directed to a particular predefined object, e.g., representing a listener location, to simulate how a listener would perceive the actual sound field of the recording 102. In the example shown, the listener is wearing headphones and is positioned at the central origin, and the waterfall sound is directed towards the listener (or originates) from the listener's right 13b and the forest sound originates from the left 11b, with a mix of the forest and waterfall sounds being directed to the listener from the other directions (e.g., front 12b, rear 10b) that are in between or elevated from the left 11b and right 13b. In this example, the experience 106 is performed by a spatial audio system that is binaurally rendering the sounds through headphones worn by an actual listener (e.g., the end user), so that that the listener hears the originally recorded sounds with proper localization and immersive character (giving the listener the impression of "being there", e.g., facing forward or in the direction of microphone 3, at the central origin of the recording 102.)

To assist a user who is a developer or author of a SR application, a spatial sound preview process (preview 108) may be performed by a computer, which enables the user to effectively preview a sound, apart from the experience 106 of the sound in the SR environment. This is also referred to here as a preview mixed sound 14, for example a single audio signal, which is produced by a spatial audio down-mixing process as a weighted combination of all of the sounds captured during recording 102. This weighted combination can be user-controlled as described below in detail, by enabling the user to manipulate a visualized representation of the sounds captured during recording 102.

Figure 2:
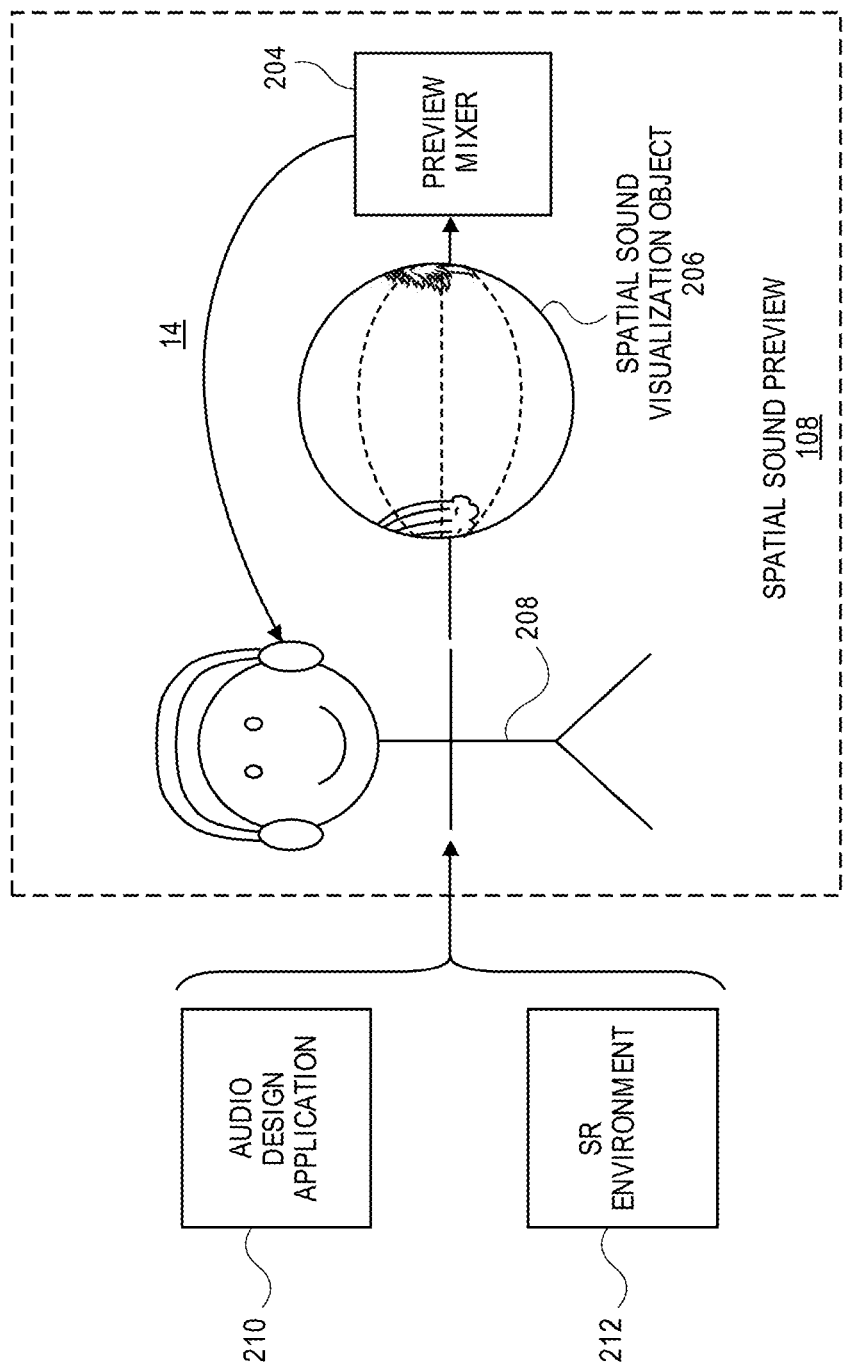
FIGS. 2 and 3 are block diagrams illustrating spatial sound preview examples in accordance with one or more embodiments described herein.

For example, with reference to FIG. 2, the process in a spatial sound preview 108 may begin with accessing a spatial sound visualization object 206 that is provided to a preview mixer 204 that operates to provide the preview mixed sound 14 that is the weighted combination of all of the sounds captured during recording 102 (and that are contained in the object 206). The spatial sound visualization object 206 can be presented (displayed) to the user as a 3D graphical object that has two or more "faces" or portions that have images of the available sounds (in the object 206), respectively. Examples include a globe, a polyhedron or a topological sphere. The interface permits the user to manipulate or re-orient the 3D graphical object (of the spatial sound visualization object 206) such that some sounds whose respective faces or portions are "facing" the listener are weighted more than the other sounds. This is especially useful as part of an authoring tool in an audio design application 210, that enables a developer (e.g., scene designers) to compose scenes for audiovisual media, including previewing and selecting sound sources. But the spatial sound preview 108 can also be employed in an SR environment 212 to give the end user the impression that a multi-faceted graphical object that the user is holding in her hand is controlling the playback of a variety of sounds; each of those sounds is associated with a respective face of the graphical object (e.g., as shown in FIG. 1, the listener 208 has turned the graphical object so that an image of a waterfall is "facing" the listener 208 and this triggers playback of the waterfall sounds that are contained in the object 206 (and which the listener 208 then hears).

Figure 3A:
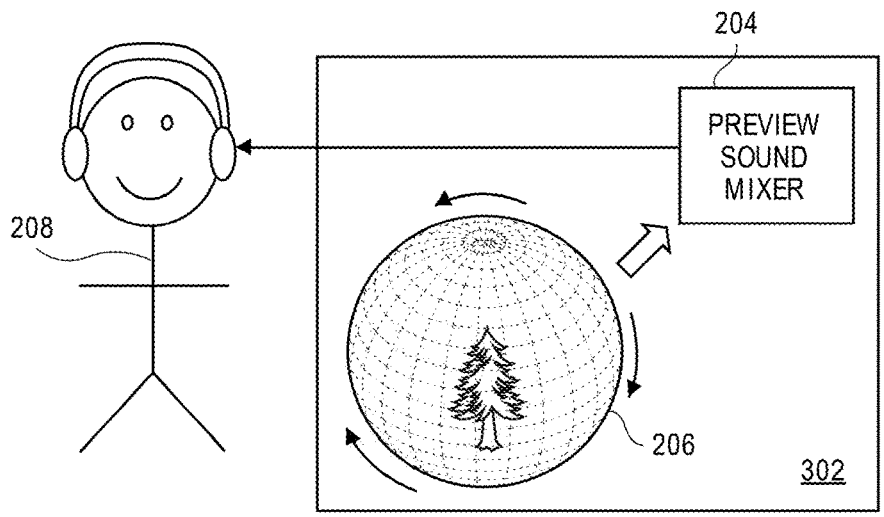
Figure 3B:
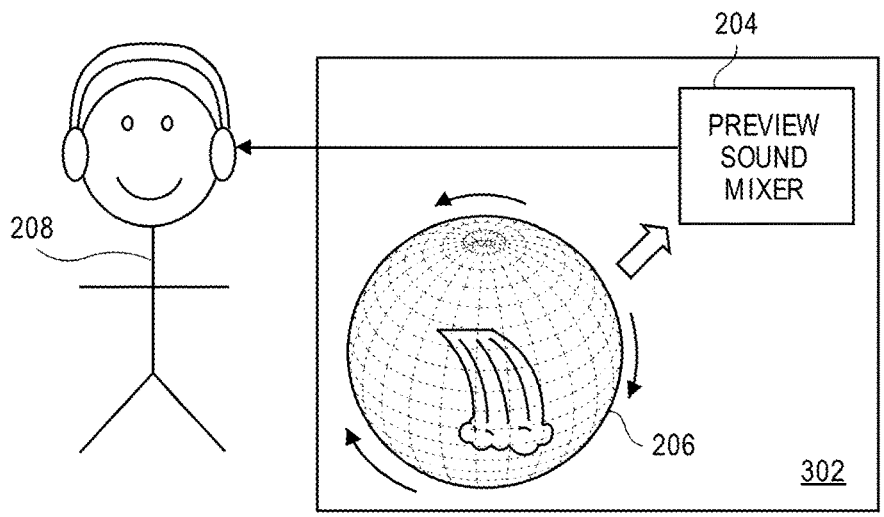
Figure 3C:
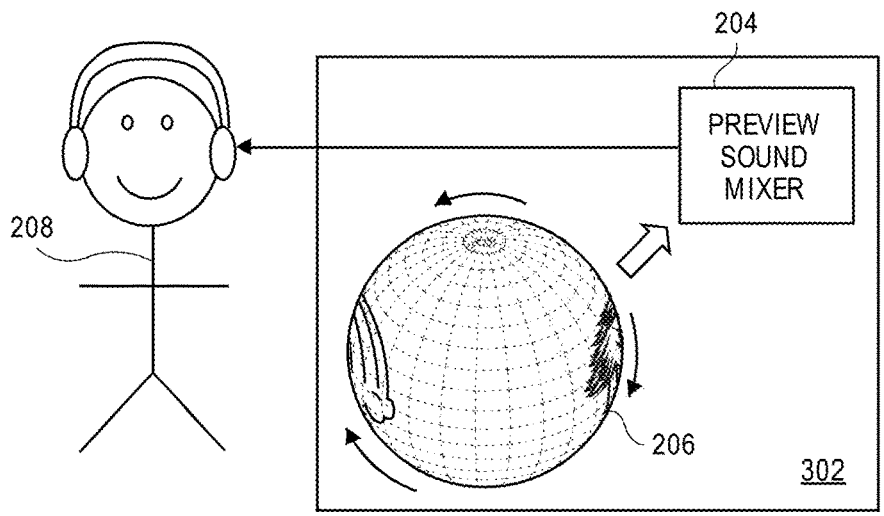

With reference to FIGS. 3A-3C, these are illustrations of three different instances of preview 108, where the listener 208 is configuring a preview sound interface 302 into three different states, respectively. The spatial sound visualization object 206 is oriented differently in each state, in accordance with instructions from the listener 208, e.g. as input via a touch screen finger scroll or via a mouse movement. In the case of FIG. 3A, the listener 208 has instructed the preview sound interface 302 to orient the 3D solid graphical object such that the image of a particular sound, here the forest, is oriented directly toward the user 208 in FIG. 3A. Similarly, when the image of the waterfall is oriented directly toward the user 208 as in FIG. 3B, the preview sound interface 302 responds by reproducing only the waterfall sound (by reducing to a minimum the weights that are assigned to all other sounds in the object 206). Finally, when both the waterfall and the forest are oriented toward the user 208 as in FIG. 3C, (or a portion of the 3D graphical object that is immediately adjacent to and between the waterfall and the forest images is oriented directly at the listener 208), then the preview sound interface 302 responds by reproducing both the waterfall and the forest sounds, e.g., weighting them equally and more than all of the other sounds in the object 206. In each example, the preview sound mixer 204 generates the previewed sound differently depending on which scene predominates by being oriented at the listener 208, e.g. forest, waterfall, or both.

Figure 4:
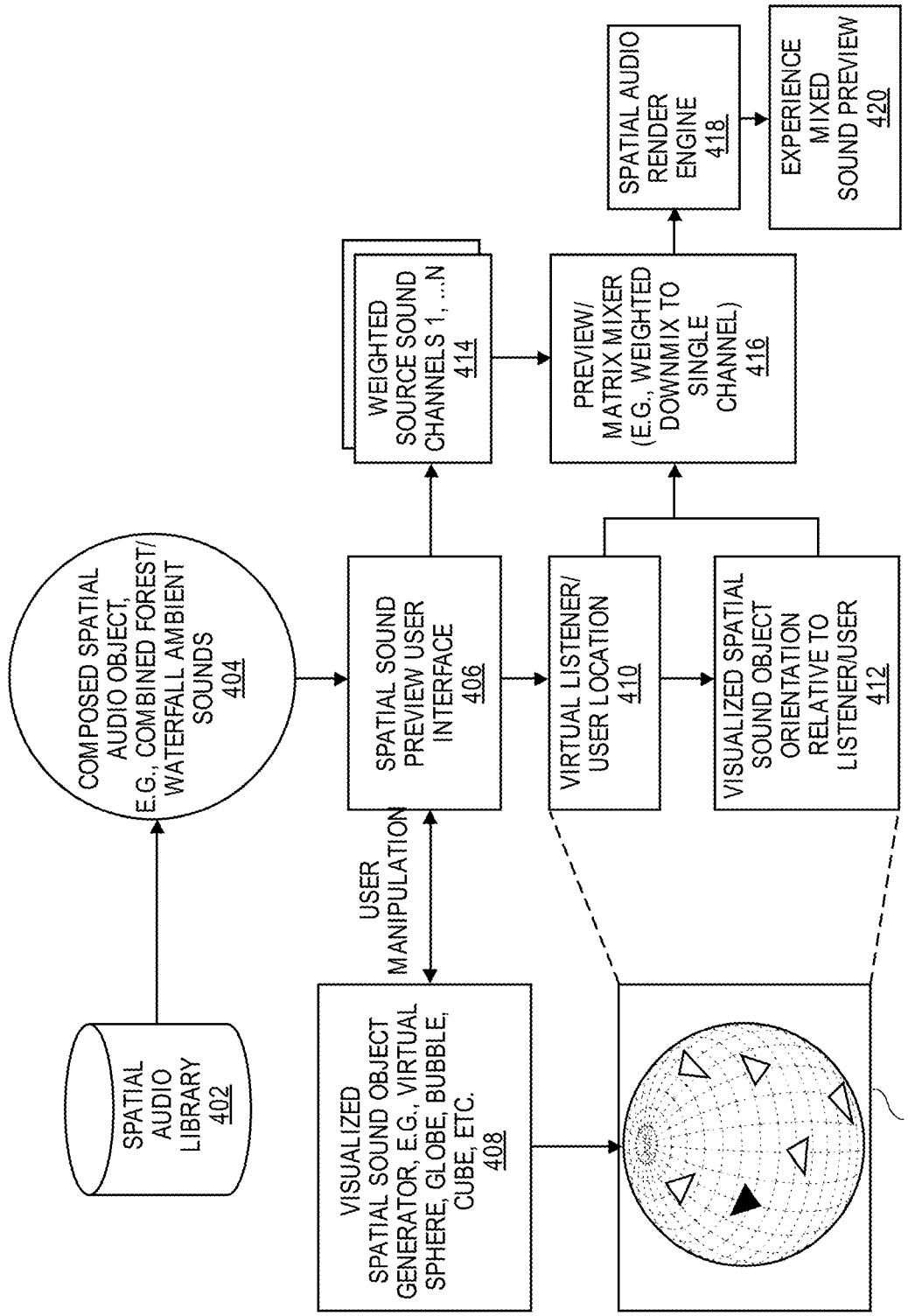
FIG. 4 is a block diagram illustrating spatial sound downmixing processes for use in previewing sound in SR environments in accordance with one or more embodiments described herein.

FIG. 4 illustrates the spatial sound preview process in further detail. In one embodiment, a composed spatial audio object 404, such as the combined forest/waterfall ambient sounds described in FIGS. 1-3A-3C is retrieved from a spatial audio library 402. A spatial sound preview user interface 406 generates (operation 408) a visualized spatial sound object 206, such as a virtual globe (e.g., sphere, bubble, cube, polyhedron, etc.) in response to a request (e.g., from the user) to preview the sound represented in the composed spatial audio object 404. In the example of FIG. 4, the object 206 is a virtual sphere having a central origin from which all of the spatial sounds represented by the different triangles will emanate. In other words, each triangle may represent a loudspeaker (acoustic output transducer) that is pointed outward and placed at the same location (the central origin of the virtual sphere).

In one embodiment, once the user has manipulated the visualized spatial sound object 206 as desired, the spatial sound preview user interface 406 generates a virtual listener/user location 410 and a visualized spatial sound object orientation 412 relative to the listener/user, and sends this information to the preview matrix mixer 416. In one embodiment, the spatial sound preview user interface 406 generates the weighted source sound channels 1 ... N 414 based on the virtual listener/user location 410 and the visualized spatial sound object orientation 412 relative to the listener/user.

In one embodiment, upon receipt of the listener/user location 410, orientation 412 and weighted channel information (weighted source sound channels 414), the preview matrix mixer 416 generates a single mixed channel of sound from a weighted downmix of the weighted source sound channels 1, ... N. The single mixed channel of sound is transmitted to a spatial audio render engine 418 for reproduction through a sound system, for the user to preview 420 the mixed sound. In one embodiment, the user can preview the mixed sound while in an SR environment, such as by previewing a portion of the SR environment, e.g. a virtual room within the SR environment, presented to the user as a bubble of the room's ambient sounds, where the bubble is the visualized spatial sound object 206. This allows, for example, an SR listener to "peek" inside a virtual room to preview the sound emanating from the room without entering it. Once the SR listener enters the room, however, the preview of the sound then changes to one that envelopes the listener as it normally would in an SR environment, e.g., as the experience 106 depicted in FIG. 1 where the listening position is now "at the center" and the previewed sounds are reproduced as spatial audio according to their assigned position in the SR application.

Returning to FIG. 4 and the preview process, in one embodiment, the weighted source sound channels 1, ... N 414 are weighted such that the channels oriented toward or pointing at the user/SR listener are the loudest in the mixed sound preview 420.

The systems and methods described herein can be implemented in a variety of different data processing systems and devices, including general-purpose computer systems, special purpose computer systems, or a hybrid of general purpose and special purpose computer systems. Exemplary data processing systems that can use any one of the methods described herein include server systems, desktop computers, laptop computers, embedded electronic devices, or consumer electronic devices.

It will be apparent from this description that aspects of the present invention may be embodied, at least in part, in software. That is, the techniques may be carried out in a data processing system in response to its processor executing a sequence of instructions contained in a storage medium, such as a non-transitory machine-readable storage medium (e.g. DRAM or flash memory). In various embodiments, hardwired circuitry may be used in combination with software instructions to implement the present invention. Example data processing systems that can perform the processes described above in the preview 108 include a laptop computer, a desktop computer, and a tablet computer; these may have access to the spatial audio library 402 which may be stored remotely in cloud storage for example.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A computer-implemented method for processing spatial audio, the method comprising the following operations performed by a computer:
   receiving a spatial audio object encoded to preserve spatial characteristics of one or more recorded sounds, wherein the spatial audio object comprises a plurality of channels of audio data representing the one or more recorded sounds, each channel being associated with any one or more of a direction and a location;
   presenting a visual representation of the spatial audio object, wherein each of the plurality of channels of audio data is associated with a portion of the visual representation based on its respective direction or location;
   weighting each channel of the plurality of channels of audio data based on an orientation of the visual representation, wherein a channel associated with a portion of the visual representation that is in a direction of a predetermined object is weighted more than a channel associated with a portion of the visual representation that is not in the direction of the predetermined object;
   downmixing the weighted channels of audio data; and
   presenting sound based on the downmixed weighted channels.

2. The computer-implemented method of claim 1, wherein presenting the visual representation comprises:
   displaying an image corresponding to a given portion of the visual representation, the image representing a predominant recorded sound represented by one or more of the plurality of channels, which are associated with the given portion of the visual representation.

3. The computer-implemented method of claim 1, wherein downmixing the weighted channels of audio data comprises orienting each of the weighted channels in a direction that is different than an original orientation of the respective weighted channel and downmixing the reoriented weighted channels.

4. The computer-implemented method of claim 1, wherein presenting sound based on the downmixed weighted channels simulates the sound as originating from a location corresponding to the visual representation.

5. The computer-implemented method of claim 1, further comprising:
   receiving a user input to re-orient the visual representation relative to the user so that a different portion of the visual representation is visible to the user.

6. The computer-implemented method of claim 5, wherein the different portion of the visual representation that is visible to the user includes an image representing a predominant recorded sound represented by channels associated with the different portion of the visual representation.

7. The computer-implemented method of claim 1, wherein weighting each channel of the plurality of channels of audio data is performed repeatedly based on updated orientations of the visual representation.

8. The computer-implemented method of claim 1, wherein presenting the visual representation comprises displaying a globe being one of a sphere or a polyhedron whose surface has a plurality of images wherein each image is a different portion of the visual representation and represents a different predominant recorded sound that is represented by the one or more channels associated with the different portion.

9. The computer-implemented method of claim 1 wherein the predetermined object is a user or represents a user location.

10. A spatial audio processing computer system comprising a processor and memory having stored therein instructions that configure the processor to:
    receive a spatial audio object encoded to preserve spatial characteristics of a plurality of recorded sounds, wherein the spatial audio object comprises a plurality of channels of audio data representing the recorded sounds, each channel being associated with any one or more of a direction, a location, or a spatial distribution;
    present a visual representation of the spatial audio object, wherein each of the recorded sounds is associated with a portion of the visual representation based on a respective direction or location of the sound;
    weight each channel of the plurality of channels of audio data based on an orientation of the visual representation, to emphasize the sound that is associated with a portion of the visual representation that is in a direction of a predetermined object more than another sound associated with a portion of the visual representation that is not in the direction of the predetermined object;
    downmix the weighted channels of audio data; and
    presenting sound based on the downmixed weighted channels.

11. The system of claim 10 wherein the memory has stored therein instructions that when executed by the processor present the visual representation by
    displaying an image corresponding to one of the portions of the visual representation, the image representing a predominant recorded sound represented by one or more of the plurality of channels, which are associated with the one of the portions of the visual representation.

12. The system of claim 10, wherein presenting sound based on the downmixed weighted channels simulates the sound as originating from a location corresponding to the visual representation.

13. The system of claim 12, wherein the memory has stored therein instructions that when executed by the processor
    receive a user input to re-orient the visual representation relative to the user so that a different portion of the visual representation is visible to the user.

14. The system of claim 13, wherein the different portion of the visual representation that is visible to the user includes an image representing a predominant recorded sound represented by channels associated with the different portion of the visual representation.

15. The system of claim 10 wherein presenting the visual representation comprises displaying a globe being one of a sphere or a polyhedron whose surface has a plurality of images wherein each image is a different portion of the visual representation and represents a different predominant recorded sound that is represented by the one or more channels associated with the different portion.

16. The system of claim 10 wherein the predetermined object is a user or represents a user location.

17. The system of claim 10 wherein the memory has stored therein instructions that when executed by the processor present the visual representation by
    displaying an image corresponding to one of the portions of the visual representation, the image representing a predominant recorded sound represented by one or more of the plurality of channels, which are associated with the one of the portions of the visual representation,
    and wherein the memory has stored therein instructions that when executed by the processor receive a user input to re-orient the visual representation relative to the user so that a different portion of the visual representation is visible to the user.

18. The system of claim 17, wherein the different portion of the visual representation that is visible to the user includes an image representing a predominant recorded sound represented by channels associated with the different portion of the visual representation.

19. The system of claim 18 wherein presenting the visual representation comprises displaying a globe being one of a sphere or a polyhedron whose surface has a plurality of images wherein each image is the different portion of the visual representation and represents a different predominant recorded sound that is represented by the one or more channels associated with the different portion.

20. The system of claim 19 wherein the predetermined object is a user or represents a user location.

* * * * *